United States Patent
Peled et al.

(10) Patent No.: US 9,882,223 B2
(45) Date of Patent: Jan. 30, 2018

(54) CATALYSTS AND ELECTRODES FOR FUEL CELLS

(75) Inventors: Emanuel Peled, Even Yehuda (IL); Arnon Blum, Mobile Post Shikmim (IL); Adi Aharon, Herzelia (IL); Nina Travitsky, Rehovot (IL); Yaron Konra, Ra'anana (IL); Kobby Saadi, Givaatime (IL); Vladimir Zel, Haifa (IL); Meital Goor, Tel Aviv (IL); Meital Alon, Tel Aviv (IL); Roy Gorenshtein, Bat-Yam (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 502 days.

(21) Appl. No.: 13/574,245

(22) PCT Filed: Jan. 24, 2011

(86) PCT No.: PCT/IB2011/000103
§ 371 (c)(1),
(2), (4) Date: Jul. 19, 2012

(87) PCT Pub. No.: WO2011/089522
PCT Pub. Date: Jul. 28, 2011

(65) Prior Publication Data
US 2012/0308907 A1    Dec. 6, 2012

Related U.S. Application Data

(60) Provisional application No. 61/297,853, filed on Jan. 25, 2010.

(51) Int. Cl.
*H01M 4/96* (2006.01)
*H01M 4/90* (2006.01)
(Continued)

(52) U.S. Cl.
CPC ........... *H01M 4/96* (2013.01); *H01M 4/9083* (2013.01); *H01M 4/921* (2013.01); *H01M 4/926* (2013.01);
(Continued)

(58) Field of Classification Search
CPC ........ H01M 4/92; H01M 4/9058; H01M 8/18; H01M 4/96; H01M 4/9083; H01M 4/921;
(Continued)

(56) References Cited

U.S. PATENT DOCUMENTS

| 4,520,081 A | 5/1985 | Hohne et al. |
| 6,183,623 B1 | 2/2001 | Cisar et al. |

(Continued)

FOREIGN PATENT DOCUMENTS

| CN | 1411618 A | 4/2003 |
| CN | 101516550 A | 8/2009 |

(Continued)

OTHER PUBLICATIONS

Chinese Office Action dated Jul. 3, 2014 corresponding to Chinese App. No. 201180006915.8 with English translation, 14 pp.

(Continued)

*Primary Examiner* — Jane Rhee
(74) *Attorney, Agent, or Firm* — Ohlandt, Greeley, Ruggiero & Perle, L.L.P.

(57) ABSTRACT

A catalyst composition comprising at least one precious metal, wherein the catalyst composition is capable of catalyzing, in the presence of a halogen ion or a mixture of halogen ions, a charging reaction and a discharging reaction in a regenerative fuel cell. This disclosure relates to electrodes comprising those catalysts that are useful in fuel cells. The catalysts are active towards hydrogen evolution reaction (HER) and hydrogen oxidation reaction (HOR) and porous electrodes are made in a process designed to control their (Continued)

porosity. The catalysts and electrodes are employed in regenerative fuel cells comprising hydrogen and halogen acid or mixture of halogen acids. The catalysts are particularly useful in hydrogen/bromine reduction/oxidation reactions. The catalysts exhibit highly acceptable life and performance.

17 Claims, 3 Drawing Sheets

(51) Int. Cl.
  *H01M 4/92* (2006.01)
  *H01M 8/0258* (2016.01)
  *H01M 8/0271* (2016.01)
  *H01M 8/0202* (2016.01)
  *H01M 8/18* (2006.01)

(52) U.S. Cl.
  CPC ........ *H01M 8/0202* (2013.01); *H01M 8/0258* (2013.01); *H01M 8/0271* (2013.01); *H01M 8/186* (2013.01); *Y02E 60/50* (2013.01); *Y02E 60/521* (2013.01); *Y02E 60/528* (2013.01); *Y02P 70/56* (2015.11); *Y10T 307/685* (2015.04)

(58) Field of Classification Search
  CPC .. H01M 4/926; H01M 8/0258; H01M 8/0271; H01M 8/0202; H01M 8/186
  See application file for complete search history.

(56) References Cited

U.S. PATENT DOCUMENTS

| | | | |
|---|---|---|---|
| 6,811,911 B1 | 11/2004 | Peled et al. | |
| 2003/0091883 A1 | 5/2003 | Peled et al. | |
| 2004/0224215 A1* | 11/2004 | Molter et al. | 429/40 |
| 2008/0057370 A1* | 3/2008 | Lee | 429/30 |
| 2009/0028767 A1 | 1/2009 | Parker et al. | |
| 2011/0275009 A1* | 11/2011 | Goto et al. | 429/506 |

FOREIGN PATENT DOCUMENTS

| | | |
|---|---|---|
| DE | 3334330 A1 | 4/1985 |
| JP | 061277 B2 | 1/1994 |
| JP | 099681 A | 1/1997 |
| JP | 2004247080 A | 9/2004 |
| JP | 2005135900 A | 5/2005 |
| JP | 2006332041 A | 12/2006 |
| JP | 2007242524 A | 9/2007 |
| JP | 2008293735 A | 12/2008 |

OTHER PUBLICATIONS

KIPO Notice of Preliminary Rejection dated Oct. 31, 2014 corresponding to Korean App. No. 10-2012-7022099 with English translation, 6 pp.
Canadian Office Action dated Apr. 9, 2014 corresponding to Canadian Patent App. No. 2,787,468, 4 pp.
Livshits, et al., "High power H2/Br2 fuel cell", Electrochemistry Communications, vol. 8 (2006) pp. 1358-1362, 5 pp.
International Preliminary Report on Patentability dated Aug. 9, 2012 for corresponding International Patent Application No. PCT/IB2011/000103.
Written Opinion of the International Preliminary Examining Authority dated Oct. 30, 2012 for corresponding International Patent Application No. PCT/IB2011/000103.
European Office Action dated Jul. 12, 2013 from corresponding European Application No. 11 714 388.3, 3 pages.
Peled, et al., "Hydrogen-Bromine Fuel Cells", Encyclopedia of Electrochemical Power Sources, Jan. 1, 2009, pp. 182-191.
International Search Report and Written Opinion dated Nov. 29, 2011 for corresponding International Patent Application No. PCT/IB2011/000103.
English translation of Japanese Office Action dated Dec. 10, 2013 corresponding to Japanese Patent App. JP2012-549440, 4 pp.
International Preliminary Report on Patentability dated Dec. 18, 2012 for corresponding International Patent Application No. PCT/IB2011/000103 consisting of 7 pages.
Canadian Patent Office action dated Feb. 3, 2015 for corresponding Canadian Patent Application No. 2,787,468 pp. 5.
Office Action dated Feb. 28, 2015 for corresponding Chinese patent application No. 201180006915.8 with English translation, pp. 20.
Office Action dated Oct. 16, 2015 for corresponding Chinese patent application No. 201180006915.8, pp. 8.
Canadian Patent Office action dated Nov. 4, 2015 from corresponding Canadian Patent Application No. 2,787,468 pp. 5.
Office Action dated Feb. 21, 2016 for corresponding Israel patent application No. 220964 English translation, pp. 3.

* cited by examiner

FIG. 3

| | %(w/w) metal | Synthesis | XPS surface | XPS bulk | EDS | Crystal size, nm (XRD) | Electrode resistance (R) measured by CV in 3M HBr [Ω·mg(TM)] |
|---|---|---|---|---|---|---|---|
| PtRe/XC-72 (1) | 82 | 2.2.1 | $Pt_{94}Re_6$ | | $Pt_{100}Re_0$ | 5.4 | 0.071 |
| PtReCo/XC-72 | 80 | 2.2.1 | $Pt_{93}Re_5Co_2$ | | $Pt_{100}Re_0Co_0$ | 2.7 | 0.049 |
| PtReMo/XC-72 | 60 | 2.2.1 | $Pt_{95}Re_5Mo_0$ | $Pt_{96}Re_3Mo_1$ | $Pt_{83}Re_0Mo_{17}$ | 4.5 | 0.059 |
| Pt/Ru/XC-72 (2) | 46 | 2.2.4 | $Pt_{100}Ru_0$ | $Pt_{43}Ru_{57}$ | $Pt_{30}Ru_{70}$ | 2.4(Pt), 5(Ru) | 0.019 Ω·mg Pt |
| Pt/Ir/Ru/XC-72 | 70 | 2.2.5 | $Pt_{28}Ir_{67}Ru_5$ | $Pt_{22}Ir_{50}Ru_{28}$ | $Pt_{11}Ir_{36}Ru_{53}$ | 2.4(Pt), 3.1(Ir), 4.5(Ru) | 0.14 Ω·mg PtIr |
| PdRe | 60 | 2.2.6 | $Pd_{95}Re_5$ | | $Pd_{98}Re_2$ | 26 | 15.4 |
| PdReCo | 80 | 2.2.6 | $Pd_{98}Re_2Co_0$ | | $Pd_{100}Re_0Co_0$ | 53 | |
| Ir (3) | 100 | Commercial | | | | 3.2 | 0.1 |
| Ir/XC-72 (4) | 36 | 2.2.7 | | | | 2.3 | 0.03 |
| Ir/Ru | 100 | 2.2.7 | | | | Amorphous | 0.8 |
| Pt/Ir (5) | 100 | 2.2.8 | $Pt_{41}Ir_{59}$ | $Pt_{17}Ir_{83}$ | $Pt_{10}Ir_{90}$ | 2.1(Ir), 4.6(Pt) | 0.06 |
| Pt/Ir | 100 | 2.2.8+cooling | $Pt_{16}Ir_{84}$ | $Pt_8Ir_{92}$ | $Pt_4Ir_{96}$ | 3.1 | 0.06 |
| Pt/Ir | 100 | 2.2.8 | $Pt_{17}Ir_{83}$ | $Pt_6Ir_{94}$ | $Pt_0Ir_{100}$ | 3.2 | 0.07 |
| Pt/Ir/XC-72 | 35 | 2.2.9 | $Pt_{74}Ir_{26}$ | $Pt_{59}Ir_{41}$ | $Pt_{50}Ir_{50}$ | | 0.016 |
| Pt/Ir/XC-72 | 40 | 2.2.9 | $Pt_{13}Ir_{87}$ | $Pt_{13}Ir_{87}$ | $Pt_{14}Ir_{86}$ | 2.2 | 0.035 |
| Pt/Ir/ XC-72 | 50 | 2.2.9 | $Pt_{45}Ir_{55}$ | $Pt_{42}Ir_{58}$ | $Pt_{45}Ir_{55}$ | 2.7 | 0.03 |
| (PtRe) /Ir | 100 | 2.2.8 | $Pt_{33}Re_0Ir_{67}$ | $Pt_{14}Re_{0.2}Ir_{86}$ | $Pt_{10}Re_0Ir_{90}$ | 2.4(Ir), 4.9(Pt) | 0.1 |
| (PtRu) /Ir | 100 | 2.2.8 | $Pt_{24}Ru_{18}Ir_{58}$ | $Pt_{18}Ru_{13}Ir_{69}$ | $Pt_9Ru_{11}Ir_{80}$ | | 0.08 |
| PtReMo/Ir | 100 | 2.2.8 | $Pt_{74}Re_1Mo_0Ir_{25}$ | $Pt_{62}Re_1Mo_1Ir_{36}$ | $Pt_{30}Re_4Mo_2Ir_{64}$ | 2.9(Ir), 7.9(alloy) | 0.06 |
| PtReCo/Ir | 100 | 2.2.8 | $Pt_{73}Re_2Co_3Ir_{22}$ | $Pt_{33}Re_2Co_2Ir_{63}$ | $Pt_{18}Re_5Co_3Ir_{74}$ | 1.7(Ir), 3.8(alloy) | 0.09 |

FIG. 4

| Catalyst type | Catalyst Metal content [wt%] | Cell # | $R_{AC}$ [Ω·cm²] | Catalyst loading TM (H2) [mg/cm²] | I charge/ I discharge [A/cm²] | Rch/Rdis [Ω·cm²] |
|---|---|---|---|---|---|---|
| PtRe/XC-72 | 82 | 89M | 0.15 (3M) | 1.3 | 0.2 | 1.1/0.9 |
| PtReCo/XC-72 | 80 | 127Y | 0.175 | 1.1 | 0.2 | 1.05/1.15 |
| PtReMo/XC-72 | 60 | 182Y | N/A | 1.1 | 0.2 | 0.55/0.65 |
| Pt/Ru/XC-72 | 46 | 396M | N/A | 1.2 | 0.25 | 0.7/0.75 |
| Pt/Ir/Ru/XC-72 | 70 | 436M | N/A | 1.6 | 0.25 | 0.7/0.8 |
| PdRe | 60 | 21A | N/A | 3 | 0.15/0.08 | 0.65/1.5 |
| PdRe | 80 | 74M | No discharge | 2.4 | | |
| Ir | 100 | 501K | 0.224 | 2.1 | 0.3/0.3 | 0.4/0.45 |
| Ir/XC-72 | 36 | - | | | | |
| Ir/Ru | 100 | - | | | | |
| Pt/Ir | 100 | 458A | 0.238 | 3.22 | 0.3/0.3 | 0.4/0.45 |
| Pt/Ir cool | 100 | 469K | 0.273 | 2.4 | 0.2/0.2 | 0.55/0.65 |
| Pt/Ir/XC-72 | 40 | 385K | 0.224 | 1.22 | 0.25/0.25 | 0.55/0.45 |
| Pt/Ir/ XC-72 | 50 | 461K | 0.266 | 1.6 | 0.25/0.25 | 0.45/0.55 |
| (PtRe) /Ir | 15at/Ir | 192K | N/A | 4.07 | 0.2/0.2 | 0.45/0.45 |
| (PtRu) /Ir | 20at/Ir | - | | | | |
| PtReMo/Ir | 40at/Ir | 191Y | N/A | 1.1 | 0.2 | 0.4/0.45 |
| PtReCo/Ir | 40at/Ir | 1008M | N/A | 1 bob | 0.2 | 0.75/0.7 |

CATALYSTS AND ELECTRODES FOR FUEL CELLS

BACKGROUND

1. Field of the Disclosure

This disclosure generally relates to catalysts, and to electrodes comprising those catalysts, for use in fuel cells. More specifically, this disclosure relates to catalysts active towards hydrogen evolution reaction (HER) and hydrogen oxidation reaction (HOR) and to porous electrodes which are made in a process designed to control their porosity, employed in regenerative fuel cells, comprising hydrogen and halogen acid or mixture of halogen acids. The catalysts are particularly useful in hydrogen/bromine reduction/oxidation reactions. The catalysts exhibit highly acceptable life and performance.

2. Discussion of the Background Art

A typical fuel cell consists of two electrodes, an anode and a cathode, and a membrane interposed between the anode and cathode. Fuel cells operate by converting fuel combustion energy, such as hydrogen, to electrical power through an electrochemical process. It does so by harnessing the electrons released from controlled oxidation-reduction (redox) reactions occurring at the surface of a catalyst dispersed on the electrodes.

A commonly used catalyst, as a result of its stability in harsh environments of regenerative fuel cells, is nanometric platinum supported on carbon black. An important issue connected to catalyst activity in regenerative fuel cells that utilize, for example, a halogen acid electrolyte, is poisoning of the hydrogen catalyst by the halides. The membrane cannot completely prevent electrolyte crossover from one side of the cell to the other. For example, in a hydrogen tri-bromide fuel cell (HTBFC), bromides, e.g., tri-bromide, diffuse to the hydrogen electrode and poison the catalyst. Despite the fact that hydrogen oxidation/evolution reaction is fast and its overpotential is rather low compared to other voltage losses in the regenerative cell, in halogen ion-containing solutions, the catalyst is severely poisoned, and this raises the overpotential of the hydrogen electrode in the regenerative fuel cell.

In fuel cells, porous electrodes are typically encountered because of the high power density and in electrolyzers because of the high rate of chemicals production per unit area. A problem common to porous electrodes is to provide the most effective pathway throughout the electrode for each reactant and product involved in the electrochemical reaction, and enhance a surface area between the active material and the electrolyte, making it as large as possible. A major drawback of porous electrodes is flooding of the electrodes. Water formed can be transported through the membrane together with protons, filling the electrode pores and preventing gas from reacting.

Acceptance of a regenerative fuel cell as a viable energy source depends on its cycle life. Regenerative fuel cells can be run, in addition to the direct mode, in the reversible mode, consuming electricity and the products of the direct reaction in order to produce the reactants of the direct reaction. For regenerative fuel cell such as hydrogen/bromine fuel cells, an important factor limiting its cycle life is the degradation of the operating fuel cell materials. These materials are exposed to a highly corrosive bromine electrolyte for long periods of time at elevated temperature.

As indicated above, bromide, e.g., tri-bromide, diffusion through the membrane from the solution to the gas electrode limits the cycle life. Ideally, the membrane would only transport protons or cations and exclude anions. Under ideal conditions in a hydrogen/bromine fuel cell, the hydrogen catalyst will only be exposed to gaseous and ionic hydrogen. In reality, the membranes do, not completely prevent bromide ions from passing through the membrane and adsorbing on the hydrogen electrode. As a result of this, the hydrogen/bromine fuel cell cycle life becomes limited because of several reasons including catalyst corrosion and poisoning of the hydrogen catalyst.

A need exists for catalysts that exhibit stability in harsh environments of regenerative fuel cells, in particular, hydrogen/halogen fuel cells. Also, a need exists for catalysts that are capable of catalyzing both charging and discharging reactions in a regenerative fuel cell, in particular, a hydrogen/halogen fuel cell. Further, a need exists for catalysts that are capable of catalyzing both HERs and HORs in a regenerative fuel cell, in particular, a hydrogen/halogen fuel cell. It would be desirable in the art to provide catalysts for regenerative fuel cells having low cost and acceptable life and performance.

SUMMARY

This disclosure generally relates to catalysts, and to electrodes comprising those catalysts, for use in fuel cells. More specifically, this disclosure relates to catalysts active towards HER and HOR and to porous electrodes which are made in a process designed to control their porosity, employed in regenerative fuel cells, comprising hydrogen and halogen acid or mixture of halogen acids. The catalysts are particularly useful in hydrogen/bromine reduction/oxidation reactions. The catalysts exhibit highly acceptable life and performance. The catalysts also have low cost that is attributable to low amounts of precious metals, e.g., platinum, present in the catalyst.

This disclosure relates in part to catalyst compositions comprising at least one precious metal, wherein the catalyst composition is capable of catalyzing, in the presence of a halogen ion or a mixture of halogen ions, a charging reaction and a discharging reaction in a regenerative fuel cell.

This disclosure relates in part to catalyst compositions comprising a core-shell structure (or a skin structure). The core (or particle), preferably contains a low concentration of Pt or a Pt alloy. The Pt alloy can include one or more other precious metals, e.g., Ru, Re, Pd and Ir, and optionally one or more, transition metals, e.g., Mo, Co and Cr. The core may also comprise a Pt-free metal or alloy. The Pt-free metal can include one or more precious metals, e.g., Ru, Re, Pd and Ir. The Pt-free alloy can include two or more precious metals, e.g., Ru, Re, Pd and Ir, and optionally one or more transition metals, e.g., Mo, Co and Cr. The shell (or skin) preferably comprises a sub-monolayer, or atom islands, to one or more layers of a precious metal, e.g., Pt or Ir, and alloys thereof. The Pt and Ir alloys can include one or more other precious metals, e.g., Ru, Re, and Pd, and optionally one or more transition metals, e.g., Mo, Co and Cr. The one or more other precious metals, e.g., Ru, Re, and Pd, are preferably present in the Pt and Ir alloys in a minor amount. Likewise, the one or more transition metals, e.g., Mo, Co and Cr, are preferably present in the Pt and Ir alloys in a minor amount. The catalyst compositions of this disclosure are capable of catalyzing, in the presence of a halogen ion or a mixture of halogen ions, a charging reaction and a discharging reaction in a regenerative fuel cell.

This disclosure also relates in part to an anode comprising a support and a catalyst dispersed thereon. The catalyst preferably comprises at least one precious metal, wherein the catalyst is capable of catalyzing, in the presence of a halogen ion or a mixture of halogen ions, a charging reaction and a discharging reaction in a regenerative fuel cell.

This disclosure further relates in part to a cathode comprising a support and a catalyst dispersed thereon. The catalyst preferably comprises at least one precious metal or carbon powder, wherein the catalyst is capable of catalyzing, in the presence of a halogen ion or a mixture of halogen ions, a charging reaction and a discharging reaction in a regenerative fuel cell This disclosure yet further relates in part to a membrane electrode assembly (MEA) comprising an anode, a cathode and a solid electrolyte membrane disposed between the anode and the cathode. The solid electrolyte membrane is either a proton exchange membrane type or preferably a nanoporous proton conducting membrane which comprises nano pores filled with an acid solution. The anode comprises a support and a catalyst dispersed thereon. The catalyst dispersed-on the anode comprises at least one precious metal. The cathode comprises a support and a catalyst dispersed thereon. The catalyst dispersed on the cathode comprises at least one precious metal and/or carbon powder. The catalyst dispersed on the anode and the catalyst dispersed on the cathode are the same or different and are capable of catalyzing, in the presence of a halogen ion or a mixture of halogen ions, a charging reaction and a discharging reaction in a regenerative fuel cell.

This disclosure also relates in part to a regenerative fuel cell comprising a housing; a solid electrolyte membrane having a first surface and a second surface, disposed in the housing to partition it into an anode side and a cathode side. The solid electrolyte membrane is either a proton exchange membrane type or preferably a nanoporous proton conducting membrane which comprises nano pores filled with an acid solution. An anode is formed on the first surface so as to connect the first surface to the anode side. A cathode is formed on the second surface so as to connect the second surface to the cathode side. The anode comprises a support and a catalyst dispersed thereon. The catalyst dispersed on the anode comprises at least one precious metal. The cathode comprises a support and a catalyst dispersed thereon. The catalyst dispersed on the cathode comprises at least one precious metal and/or carbon powder. The catalyst dispersed on the anode and the catalyst dispersed on the cathode are the same or different and are capable of catalyzing, in the presence of a halogen ion or a mixture of halogen ions, a charging reaction and a discharging reaction in the regenerative fuel cell.

This disclosure further relates in part to a regenerative fuel cell comprising a solution compartment (i.e., cathode side), a gas compartment (i.e., anode side) and a membrane electrode assembly (MEA) disposed between the solution compartment and the gas compartment. The membrane electrode assembly (MEA) comprises an anode, a cathode and a solid electrolyte, membrane disposed between the anode and the cathode. The solid electrolyte membrane is either a proton exchange membrane type or preferably a nanoporous proton conducting membrane which comprises nano pores filled with an acid solution. The anode preferably comprises a support and a catalyst dispersed thereon. The catalyst dispersed on the anode preferably comprises at least one precious metal. The cathode preferably comprises a support and a catalyst dispersed thereon. The catalyst dispersed on the cathode preferably comprises at least one precious metal and/or carbon powder. The catalyst dispersed on the anode and the catalyst dispersed on the cathode are the same or different and are capable of catalyzing, in the presence of a halogen ion or a mixture of halogen ions, a charging reaction and a discharging reaction in the regenerative fuel cell.

This disclosure yet further relates in part to a catalyst composition comprising at least one precious metal, wherein the catalyst composition is capable of catalyzing, in the presence of a halogen ion or a mixture of halogen ions, a reaction between a fuel and an oxidant to generate an electric current.

This disclosure also relates in part to a fuel cell comprising an anode, a cathode and a solid electrolyte membrane disposed between the anode and the cathode. The solid electrolyte membrane is either a proton exchange membrane type or preferably a nanoporous proton conducting membrane which comprises nano pores filled with an acid solution. The anode comprises a support and a catalyst dispersed thereon. The catalyst dispersed on the anode comprises at least one precious metal. The cathode comprises a support and a catalyst dispersed thereon. The catalyst dispersed on the cathode comprises at least one precious metal and/or carbon powder. The catalyst dispersed on the anode and the catalyst dispersed on the cathode are the same or different and are capable of catalyzing, in the presence of a halogen ion or a mixture of halogen ions, a reaction between a fuel and an oxidant to generate an electric current.

BRIEF DESCRIPTION OF THE DRAWINGS

FIG. 3 shows a characterization of catalysts that were synthesized in the Examples below.

FIG. 4 shows the results for the 7 cm$^2$ fuel cell tests as described in the Examples below.

DETAILED DESCRIPTION OF THE PREFERRED EMBODIMENT

Figure 1:
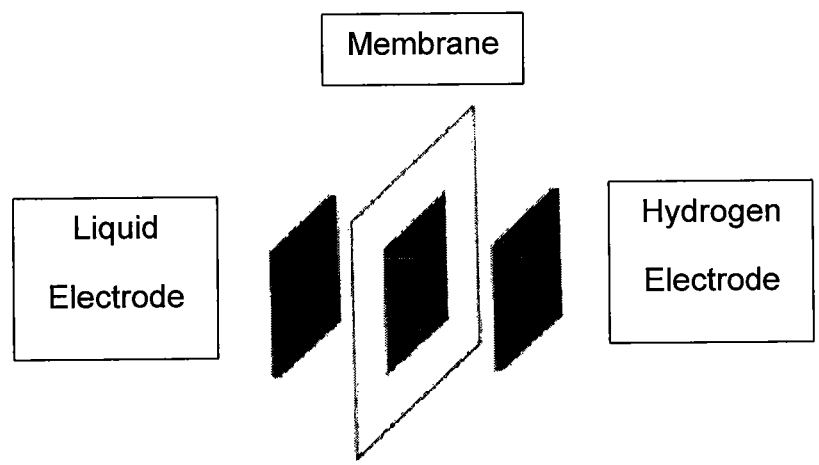
FIG. 1 is a schematic representation of an MEA (membrane electrode assembly).

This disclosure provides catalyst compositions that include at least one precious metal. The catalyst compositions are capable of catalyzing a charging reaction and a discharging reaction in a regenerative fuel cell, e.g., a hydrogen/bromine regenerative fuel cell. The catalyst compositions are also capable of catalyzing hydrogen redox reactions and halogen/halide redox reactions. Further, the catalyst compositions are capable of catalyzing hydrogen evolution reactions (HERs) and hydrogen oxidation reactions (HORs). Particularly, the catalyst compositions are capable of catalyzing HERs and HORs in harsh environments, e.g., in the presence of a halogen ion or a mixture of halogen ions.

The catalyst compositions of this disclosure can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst compositions include PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst compositions useful in this disclosure include those where the at least one precious metal is supported on carbon powder or ceramic powder.

The catalyst compositions of this disclosure include precious metals, precious metal alloys (e.g., precious metals alloyed with other precious metals, transition metals and/or other elements), or precious metal mixtures (e.g., precious metals mixed with other precious metals, transition metals and/or other elements). The catalysts have been found to be more active towards HOR and HER reactions and more stable in tri-bromide solutions than state-of-the art Pt catalysts. The catalysts can be used for HOR in proton exchange membrane fuel cells (PEMFCs).

The catalyst compositions can be made by conventional procedures known in the art. The catalysts in the Examples below were synthesized and characterized by physical characterization methods and their activity is tested electrochemically. The catalysts can be supported on carbon or ceramic-powder. The catalyst compositions can be synthesized, for example, by electroless deposition or by polyol method. The catalyst compositions of this disclosure having a core-shell structure (or a skin structure) can be prepared by conventional procedures known in the art such as shown in the Examples below.

The unsupported catalysts of this disclosure have grain sizes typically in the range of from about 2 to about 8 nm, excluding Pd containing catalysts which grain size is in the range of from about 26 to about 53 nm. The supported catalysts of this disclosure have grain sizes typically in the range of from about 2 to about 7 nm. Most of the Pt and Ir containing catalysts comprise a skin-type structure, having an outer-shell rich in platinum, iridium and their alloys. In an embodiment, this disclosure includes skin-type catalysts. Skin-type catalysts were found to be highly active and stable in HER and NOR reactions in HTBFCs, tested in-situ and ex-situ. The durability of the catalysts of this disclosure, including sub monolayer ones, atom islands, and one or more monolayers of Pt and Ir and their alloys, with or without other elements, were found to be very good. Many thousands of charge-discharge (HOR/HER) cycles were achieved utilizing the catalysts of this disclosure in a hydrogen/bromine regenerative fuel cell.

In particular, for the catalyst compositions of this disclosure comprising a core-shell structure (or a skin structure), the core (or particle) preferably contains a low concentration of Pt or a Pt alloy. The Pt alloy can include one or more other precious metals, e.g., Ru, Re, Pd and Ir, and optionally one or more transition metals, e.g., Mo, Co and Cr. The core may also comprise a Pt-free metal or alloy. The Pt-free metal can include one or more precious metals, e.g., Ru, Re, Pd and Ir. The Pt-free alloy can include two or more precious metals, e.g., Ru, Re, Pd and Ir, and optionally one or more transition metals, e.g., Mo, Co and Cr. The shell (or skin) preferably comprises a sub-monolayer, or atom islands, to one or more layers of a precious metal, e.g., Pt or Ir, and alloys thereof. The Pt and Ir alloys can include one or more other precious metals, e.g., Ru, Re, and Pd, and optionally one or more transition metals, e.g., Mo, Co and Cr. The one or more other precious metals, e.g., Ru, Re, and Pd, are preferably present in the Pt and Ir alloys in a minor amount. Likewise, the one or more transition metals, e.g., Mo, Co and Cr, are preferably present in the Pt and Ir alloys in a minor amount. The catalyst compositions of this disclosure are capable of catalyzing, in the presence of a halogen ion or a mixture of halogen ions, a charging reaction and a discharging reaction in a regenerative fuel cell.

Carbon powder can also be a suitable catalyst for use in this disclosure. For bromide/tribromine redox reaction in the solution electrode, it has been found that carbon powder itself is an effective catalyst for the processes, reduction and oxidation. In another embodiment, the solution electrode may be used without any metallic catalyst.

This disclosure provides electrodes that are useful in the operation of fuel cells. The electrodes of this disclosure include anodes and cathodes that each include a support and a catalyst dispersed thereon. The electrodes can be made by processes described herein or by conventional procedures known in the art.

The catalysts dispersed on the electrodes are commonly nano particles (preferably 2-5 nm) of Pt, Ir, Pt alloys, and Ir with or without other elements. However, in order to save the cost of expensive noble metals, it is possible to use non-noble metal based alloys such as for example Ni, Fe, Co, Ir, or Ru as the core and coat them with the required noble metal catalyst by common electrochemical or chemical, processes. The thickness of such catalyst layer may be between less than one monolayer to 10 monolayers.

Electrodes according to this disclosure are porous, and are made by processes designed to control their porosity and hydrophobicity. For example, the electrodes can be fabricated by coating a carbon support (for example, a commercially available carbon cloth or paper) with a suspension comprising carbon powder, a polymeric binder, and in some cases a pore-former. The suspension can optionally comprise powder of metallic catalyst. For solution electrodes, a metallic catalyst is optional, whereas for hydrogen electrodes, a metallic catalyst is required. The suspension (with or without catalyst) is referred herein as "ink". The suspension is mixed for several hours, applied to the carbon support, solidified, optionally by drying and heating, and then washed, for example, with solvents and/or water to remove the pore former, leaving pores behind. The resulting layer is called a microporous layer or a diffused layer and, in the gas side, it is called a gas diffused layer (GDL). Electrodes used with rechargeable fuel cells in accordance with this disclosure have a porosity of between about 30% and about 80% (vol/vol). Preferably, a porosity of between about 40% and about 80% (vol/vol) provides convenient and efficient electrodes.

In an embodiment, the fuel cell uses the same electrodes for charging and for discharging modes. In such an embodiment, the fuel cell typically has a solution compartment, a hydrogen compartment, and a membrane electrode assembly connecting between them. The electrodes can be used in different types of fuel cells, and preferably are used in regenerative fuel cells, e.g., hydrogen/bromine regenerative fuel cells.

The porous electrode can comprise a gas diffusion layer, characterized by the reactant or/and the product being a gas ($H_2$ in the case of HTBFC) and catalytic layer, having a highly dispersed catalytic powder mixed with polymeric binder, e.g., PVDF (polyvinylidene fluoride) and PTFE (polytetrafluoroethylene) ionomer such as Nafion™ polymer. The reaction can take place at the three-phase zone; where gas and liquid electrolyte react on a solid catalyst surface.

The anodes and cathodes of this disclosure can comprise a catalyst layer and a porous backing layer. A preferred catalyst used at the anode is; for example, nano sized Pt—Ir alloy powder. A preferred catalyst used at the cathode is, for example, the same nano sized Pt—Ir alloy powder as used at the anode. The core-shell structure (or a skin structure) catalysts include sub-monolayers, atom islands, and one or more layers of a precious metal, e.g., Pt or Ir, and alloys thereof, with or without other elements. En such alloys used in the core-shell structure (or a skin structure) catalysts, the ratio between platinum or iridium and the metal (Pt:M or Ir:M atomic ratio) is between about 1:10 to about 10:1.

The backing layer is preferably made of carbon. This backing layer is porous and is used for support and, at the same time for making electrical contact between the housing and the catalyst powder, which by itself is connected to the membrane.

As a result of long operation, the bond between the catalyst particles and the supporting carbon matrix is lost, leading to the degradation of the fuel cell. In view of that it is proposed in this disclosure to bind the nano size catalyst to a nano size ceramic powder and subsequently bind the obtained particles to the carbon backing layer and to the PCM. A good way to perform this is to use the well-known commercially available electroless process. According to this process, up to one monolayer of a catalyst salt (like $PtCl_4$, $RuCl_3$, etc.) is adsorbed in the first step on nano size hydrated silica powder by immersing the powder in a solution containing a predetermined amount of the catalyst salt. Then, in the second step, a proper amount of a reducing agent like formaldehyde, methanol, formic acid or hypophosphite is added at a suitable pH and temperature to form up to one monolayer of catalyst bonded to the surface of the ceramic powder. This monolayer provides nucleation sites for further deposition. Next, one or several catalyst salts and more reducing agents are added to form the final size and structure of the catalyst particles. For the anode it is preferred to form either a Pt—Ru or Pt—Ir alloy catalyst layer or to form two consecutive layers of either Pt on Ru or Pt on Ir with atomic ratio of 1:10 to 10:1. Other elements, like Sn, Mo, or Ni can be added to the catalyst layer to further improve reaction kinetics. Catalyst layers for the anode and cathode can be the same or different.

For the anodes of this disclosure, the catalyst comprises at least one precious metal. The catalyst is capable of catalyzing a charging reaction and a discharging reaction in a regenerative fuel cell, e.g., a hydrogen/bromine regenerative fuel cell. The catalyst is also capable of catalyzing hydrogen redox reactions. Further, the catalyst is capable of catalyzing HERs and HORs. Particularly, the catalyst is capable of catalyzing HERs and HORs in harsh environments, e.g., in the presence of a halogen ion or a mixture of halogen ions.

For the anodes of this disclosure, the catalyst can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst includes PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst useful in this disclosure include those where the at least one precious metal is supported on carbon powder or ceramic powder.

For the anodes of this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The anode support may have any number of pores and pore sizes such as, for example, random and ordered pore arrays, including pore arrays having selected pore diameters, depths, and distances relative to one another. The anode supports of this disclosure can have any number of possible porosities and/or void spaces associated therewith.

The anode can comprise a carbon support layer, optionally a gas diffusion layer, and a catalytic layer. The catalytic layer can be coated onto the carbon support layer. The gas diffusion layer can be coated onto the carbon support layer and the catalytic layer can be coated onto the gas diffusion layer. The catalytic layer can also be coated onto the solid electrolyte membrane or proton conducting membrane.

For the cathodes of this disclosure, the catalyst comprises carbon powder and/or at least one precious metal and carbon powder. The catalyst is capable of catalyzing, in the presence of a halogen ion or a mixture of halogen ions, a charging reaction and a discharging reaction in a regenerative fuel cell, e.g., a hydrogen/bromine regenerative fuel cell. The catalyst is also capable of catalyzing halogen/halide redox reactions.

For the cathodes of this disclosure, the catalyst can include, for example, neat carbon powder or at least one catalyst selected from the group consisting of Ir, Ru, Pd, Pt, Mo, Re, and alloys thereof, mixed or deposited on carbon powder. In an embodiment, the catalyst compositions include, for example, (PtRe)/M, (PdRe)/M, and (PtM)/Ir, wherein M is a precious metal or a transition metal. Preferably, the catalyst includes PtRe, PdRe, Pt/Ir, Pd/Ir, Pt/Ru, (PtIr)/Ru, Ir/Ru, (PtRe)/Ir, and (PtRu)/Ir. The catalyst useful in this disclosure include those where the at least one precious metal is supported on carbon powder or ceramic powder.

For the cathodes of this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The cathode support may have any number of pores and pore sizes such as, for example, random and ordered pore arrays, including pore-arrays having selected pore diameters, depths, and distances relative to one another. The cathode supports of this disclosure can have any number of possible porosities and/or void spaces associated therewith.

The cathode can comprise a carbon support layer, optionally a microporous layer, and optionally a catalytic layer. The catalytic layer can be coated onto the carbon support layer. The microporous layer can be coated onto the carbon support layer and the catalytic layer can be coated onto the microporous layer. The catalytic layer can also be coked onto the solid electrolyte membrane or proton conducting membrane.

This disclosure provides a membrane electrode assembly (MEA) that comprises an anode, a cathode and a solid electrolyte membrane disposed between the anode and the cathode. The anode comprises a support and a catalyst dispersed thereon, wherein the catalyst comprises at least one precious metal. The cathode comprises a support and a carbon powder or catalyst dispersed with or on a carbon powder, wherein the catalyst comprises at least one precious metal or carbon powder. The catalyst dispersed on the anode and the catalyst dispersed on the cathode are the same or different and are capable of catalyzing, in the presence of a halogen ion or a mixture of halogen ions, a charging reaction and a discharging reaction in a regenerative fuel cell, e.g., a hydrogen/bromine regenerative fuel cell.

In the MEA, the catalyst dispersed on the anode and the catalyst dispersed on the cathode are capable of catalyzing hydrogen redox reactions and halogen/halide redox reactions. Also, in the MEA, the catalyst dispersed on the anode and the catalyst dispersed on the cathode are capable of catalyzing a charging reaction and a discharging reaction in a regenerative fuel cell in the presence of a halogen ion or a mixture of halogen ions.

In the MEA, a preferred solid electrolyte membrane is a proton conducting membrane having pores with a diameter size which is essentially smaller than 30 nm. The solid proton conducting membrane comprises: (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxygen and said fuel; and (iii) 10 to 90% by volume of an acid, or aqueous acid solution.

The solid proton conducting membranes useful in the fuel cells of this disclosure are described in U.S. Pat. Nos. 6,447,943 and 6,492,047, which are incorporated herein in their entirety by reference thereto. The polymeric binders used in these membranes are selected from the group consisting of: poly(vinylidenfluoride), poly(vinylidenfluoride)hexafluoropropylene, poly(tetrafluoroethylene), poly(methyl methacrylate), poly(sulfoneamide), poly(acrylamide), poly(vinylchloride), acrylonitrile, poly(vinylfluoride), Kel F™ and any combinations thereof.

The inorganic nanosize powder used for preparing the solid proton conducting membrane is selected from the group consisting of $SiO_2$, $ZrO_2$, $B_2O_3$, $TiO_2$, $Al_2O_3$, hydroxides and oxy-hydroxides of Ti, Al, B and Zr, and any combinations thereof.

The proton conducting membranes useful in the fuel cells of this disclosure also comprise an acid or aqueous acid solution. As opposed to the solid electrolyte membrane described, for example, in U.S. Pat. No. 5,599,638, which is incorporated herein by reference thereto in its entirety, wherein no acid is present in free form, the solid electrolyte membrane discussed here, when used in the fuel cells, contains free acid molecules entrapped in the pores of the membrane. Alternatively, it may contain acid molecules bonded to the inorganic powder. The typical diameter of these pores is essentially smaller than 30 nm, preferably smaller than 20 nm, and more preferably smaller than 3 nm.

A large variety of low vapor pressure acids that are compatible with the cell hardware and with the catalysts at both electrodes can be used and adapted to a specific application. The following list of acids is given for example: polyfluoroolefin sulfonic acid, perfluoroolefin sulfonic acid, polyfluoroaryl sulfonic acids such as polyfluorobenzene, polyfluorotoluene, or polyfluorostyrene sulfonic acid, perfluoroaryl sulfonic acids such as perfluorobenzene, perfluorotoluene or perfluorostyrene sulfonic acid, similar acids where up to 50% of the hydrogen or fluorine atoms were replaced by chlorine atoms, $CF_3(CF_2)_nSO_3H$, $HO_3S(CF_2CH_2)_nSO_3H$, $CF_2(CF_2CH_2)_nSO_3H$, $HO_3S(CF_2)_nSO_3H$, where n is an integer having a value of 1 to 9, Nafion™ ionomers, HCl, HBr, phosphoric acid, sulfuric acid, and mixtures thereof.

Alternatively, the solid electrolyte membrane is a proton conducting membrane (PCM) comprising pores with a typical diameter-size which is essentially smaller than 50 nm, preferably smaller than 3 nm, and more preferably smaller than 1.5 nm.

A further membrane according to the present disclosure is film made of a proton conducting matrix as described in U.S. Pat. No. 6,811,911, which is incorporated herein in its entirety by reference thereto. The ion conducting matrix comprises: (i) 5% to 60% by volume of an inorganic powder having a good aqueous electrolyte absorption capacity; (ii) 5% to 50% by volume of a polymeric binder that is chemically compatible with an aqueous electrolyte; and (iii) 10 to 90% by volume of an aqueous electrolyte, wherein the inorganic powder comprises essentially sub-micron particles, preferably from about 5 to about 150 nm in size. The matrix of the present disclosure may, optionally, comprise between about 0.1% to about 25% of anon-volatile liquid lubricant that is chemically compatible with all the components in the matrix.

In accordance with a preferred embodiment of the present disclosure, the inorganic powder is characterized in that it has a surface area of at least 10 $m_2/g$, and possesses a good absorption capability for the aqueous electrolyte.

The PCM of the present disclosure has the general appearance of a plastic film having good mechanical properties. It can typically be bent to about 180° with no substantial fractures occurring, and it can be prepared in thickness being in the range of from about 10 to about 1000 microns or more. Due to its stability and good ionic conductivity, it can be used at a large temperature range of from sub-zero to about 150° C.

According to a preferred embodiment of the disclosure, where the matrix is in the preparation of a membrane, the inorganic powder comprised in the matrix is a very fine, electronically non-conductive powder having a particle size of preferably less than 150 nm. According to this embodiment, the PCM pores in which the aqueous electrolyte is absorbed are very small, and their characteristic dimension is essentially smaller than 50 nm.

The absorption capacity or the retention capability of the membrane for the acid or the aqueous electrolyte used depends on several parameters, among which are the composition and the type of the inorganic powder, the polymeric binder and the type of the dissolved acid or electrolyte. The combination of these parameters should be optimized in order to tailor the product for each application. While carrying out such optimization, consideration should be given to the fact that the highest the content of inorganic powder is the inferior the mechanical properties become. Increasing the inorganic powder content of the matrix increases its electrolyte retention characteristic, but at the same time, decreases its mechanical strength. On the other hand, increasing the polymeric binder in the matrix increases the strength of the latter, but decreases the wettability of the matrix thus turning it to a less conductive one.

According to yet another embodiment of the disclosure, an improvement of the matrix wettability and consequently the electrolyte retention, is achieved by adding to the membrane multi valance metal salts such as Al, Zr, B, Ti and the like.

According to another embodiment of the disclosure, the improvement of the matrix wettability and consequently the electrolyte retention is achieved by pre-treating the inorganic powder with an acid or a base prior to the preparation of the membrane.

This disclosure also relates to a process for producing a proton-conducting membrane (PCM), the process comprising: mixing (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxidizer and the fuel; and (iii) 10 to 90% by volume of an acid or aqueous acid solution, wherein the mixing is conducted at various rate steps, thereby producing a proton-conducting mixture;

continuously casting the proton-conducting mixture on rolled paper, non-woven matrix or any other coatible material at ambient temperature; drying the casted proton-conducting mixture at a temperature of greater than 100° C. for approximately 5 to 60 minutes, thereby forming a dry film; laminating a plurality of the dry films together under pressure, and thereafter extracting pore-former out of pores of the dry films, thereby forming the proton-conducting membrane having an average pore size of less than 30 nanometers.

The PCM of the present disclosure comprises a nanosize ceramic powder with good acid adsorption capacity, a polymer binder, and an acid absorbed in nanosize pores. This PCM is particularly useful in regenerative fuel cell (RFC) applications.

The main components of the PCM are a polymeric binder, an inorganic nanosize powder, and an acidic solution or acid. The typical diameter of the PCM pores is about between 1.5 to 30 nm, preferably 3 nm. The pores are filled with free acid molecules, which is a major advantage for the application of energy storage system (e.g., RFC applications) that uses an acidic electrolyte.

The reagents (i.e., powders and solvents) are mixed with additives that improve the quality of the solution and results in better mechanical and physical properties of the cast film. The solution is then cast using a mechanical coater, which is a more efficient process and more homogeneous one.

Preferably, at least 2 to 6, preferably 4, of the dry films are laminated together. The various rate steps of the mixing step comprises: mixing for between 1 to 5 hours at a mixing rate of between about 100 to 500 rpm at room temperature; mixing for between 10 to 20 hours at a mixing rate of between about 400 to 700 rpm at a temperature in the range between about 30 to 50° C.; mixing for between 10 to 20 hours at a mixing rate of between about 100 to 400 rpm at room temperature; and degassing for between 5 to 30 minutes at a temperature in the range between about 30 to 50° C. The step of continuously casting the proton-conducting mixture is performed using a coater machine for solution application over the rolled paper, non-woven matrix or the like roll to roll carrier support.

The carrier support is a siliconized paper, and the rolling speed of the carrier support is set according to the specific gravity of the proton-conducting mixture.

The dry film has a thickness between about 40 to 60 micrometers, more preferably between about 50 to 55 micrometers.

Preferably, the step of laminating the dry films is performed at the pressure in the range between about 5 to 20 kg/cm$^2$ and at a temperature in the range between about 130 to 150° C. for between about 3 to 10 minutes.

The process further comprising adding at least one rheology control agent prior to mixing. The rheology control agent is at least one selected from the group consisting of: SPAN80 (generic chemical description sorbitan monooleate, $C_{24}H_{44}O_6$), and Zonyl® FSN (generic chemical description $(C_2H_{4O})_x(CF_2)_yC_2H_5FO$, nonionic fluorosurfactant).

The extraction step comprises: (a) immersing the proton-conducting membrane with pore-former in an ether/ethanol mixture for a period of time sufficient to remove the pore-former from the pores of the proton-conducting membrane; (b) immersing the proton-conducting membrane from step (a) in ethanol to remove any residual pore-formers and other solvents; and (c) immersing the proton-conducting membrane in water to remove the ethanol from the pores.

The ether/ethanol mixture has a ratio of between about 1:9 to 3:7. The immersing step (a) takes place for between about 1 to 5 hours. The immersing step (b) takes place for between about 1 to 5 hours.

The polyfluoroaryl sulfonic acid is at least one selected from the group consisting of: polyfluorobenzene, polyfluorotoluene, and polyfluorostyrene sulfonic acid. The perfluoroaryl sulfonic acid is at least one selected from the group consisting of: perfluorobenzene, perfluorotoluene and perfluorostyrene sulfonic acid.

The process further comprising a pore former selected from the group consisting of: DBP (i.e. dibutyl phthalate), diethyl phthalate, dimethylphthalate, propylene carbonate, ethylene carbonate and the like or any combinations thereof.

The process further comprising the step of recapturing the acid or aqueous acid solution.

The PCMs used in the fuel cells of this disclosure have good ionic conductivity, are not affected by heavy metals impurities, and can be used at temperatures even higher than 100° C. or lower than 0° C.

Nanoporous-proton conducting membranes (NP-PCM) employed in the MEAs of this disclosure allow water management which prevents porous electrodes from flooding. This makes such electrodes advantageous for use in the fuel cells of this disclosure.

In the MEA, the catalyst dispersed on the anode is capable of catalyzing hydrogen redox reactions—HERs and HORs. Further, the catalyst dispersed on the anode is capable of catalyzing HERs and HORs in the presence of a halogen ion or a mixture of halogen ions.

For the anode in the MEA of this disclosure, the catalyst can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst includes PtRe, PdRe, PtIr, PdIr, PtCr, PtRu, Pt/Ir/Ru; PtReCo, PtReMo, Ir/Ru, (PtRe)/Ir, (PtRu)/Ir, (PtReMo)/Ir, and (PtReCo)/Ir. The catalyst useful in this disclosure include those where the at least one precious metal is supported on carbon powder or ceramic powder.

For the anode in the MEA of this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The anode support may have any number of pores and pore sizes such as, for example, random and ordered pore arrays, including pore arrays having selected pore diameters, depths, and distances relative to one another. The anode supports of this disclosure can have any number of possible porosities and/or void spaces associated therewith.

In the MEA, the catalyst dispersed on the cathode is capable of catalyzing halogen/halide redox reactions.

For the cathode in the MEA of this disclosure, the catalyst can include, for example, neat carbon powder or at least one catalyst selected from the group consisting of Ir, Ru, Pd, Pt, Mo, Re, and alloys thereof, mixed or deposited on carbon powder. In an embodiment, the catalyst compositions include, for example, (PtRe)/M, (PdRe)/M, and (PtM)/Ir, wherein M is a precious metal or a transition metal. Preferably, the catalyst includes PtRe, PdRe, Ptar, Pd/Ir, Pt/Ru, (PtIr)/Ru, Ir/Ru, (PtRe)/Ir, and (PtRu)/Ir. The catalyst useful in this disclosure include those where the at least one precious metal is supported on carbon powder or ceramic powder.

For the cathode in the MEA of this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The cathode support may have any number of pores and pore sizes such as, for example, random and ordered pore arrays, including pore arrays having selected pore diameters, depths, and distances relative to one another. The cathode supports of this disclosure can have any number of possible porosities and/or void spaces associated therewith.

This disclosure provides a regenerative fuel cell comprising a housing; a solid electrolyte membrane having a first surface and a second surface, disposed in the housing to partition it into an anode side and a cathode side; an anode formed on the first surface so as to connect the first surface to the anode side; and a cathode formed on the second surface so as to connect the second surface to the cathode side. The anode comprises a support and a catalyst dispersed thereon. The catalyst dispersed on the anode comprises at least one precious metal. The cathode comprises a support and a catalyst dispersed thereon. The catalyst dispersed on the cathode comprises at least one precious metal on carbon powder, or mixture thereof. The catalyst dispersed on the anode and the catalyst dispersed on the cathode are the same or different and are capable of catalyzing, in the presence of a halogen ion or a mixture of halogen ions, a charging reaction and a discharging reaction in the regenerative fuel cell, e.g., a hydrogen/bromine regenerative fuel cell.

In the regenerative fuel cell, the catalyst dispersed on the anode and the catalyst dispersed on the cathode are capable of catalyzing hydrogen redox reactions and halogen/halide redox reactions. Also, in the regenerative fuel cell, the catalyst dispersed on the anode and the catalyst dispersed on the cathode are capable of catalyzing a charging reaction and a discharging reaction in the regenerative fuel cell in the presence of a halogen ion or a mixture of halogen ions.

Nanoporous-proton conducting membranes (NP-PCM) employed in the regenerative fuel cells of this disclosure allow water management which prevents porous electrodes from flooding. This makes such electrodes advantageous for use in the fuel cells of this disclosure.

Generally, single cells are combined into a fuel cell stack to produce the desired level of electrical power.

This disclosure provides a regenerative fuel cell comprising a solution compartment, a gas compartment and a MEA disposed between the solution compartment and the gas compartment. The MEA comprises an anode, a cathode and a solid electrolyte membrane disposed between the anode and the cathode. The anode faces the gas compartment and the cathode faces the solution compartment. The anode comprises a support and a catalyst dispersed thereon, wherein the catalyst comprises at least one precious metal. The cathode comprises a support and a catalyst dispersed thereon, wherein the catalyst comprises at least one precious metal or carbon powder. The catalyst dispersed on the anode and the catalyst dispersed on the cathode are the same or different and are capable of catalyzing, in the presence of a halogen ion or a mixture of halogen ions, a charging reaction and a discharging reaction in the regenerative fuel cell.

A hydrogen/bromine (tribromide) regenerative electrochemical cell is well suited for energy storage applications such as peak shaving, load management and other emerging distributed utility applications. A regenerative hydrogen/bromine cell facilitates electrical energy storage by consuming electricity in electrolyzing hydrogen bromide into hydrogen and tribromide and some bromine reactants as stored chemical energy. The hydrogen and tribromide are later reacted electrochemically in the cell to produce electrical energy. Hence, the cell is regenerative (reversible), in that it can efficiently operate as an electrolysis cell producing reactants and consuming electricity or a fuel cell consuming reactants and producing electricity. The cell exchanges electrical and chemical energy.

The hydrogen/tribromide regenerative electrochemical cell offers several advantages, for example, the hydrogen and bromine electrodes are fully reversible allowing very high electric-to-electric efficiencies. The same electrodes can be used as electrocatalysts for both chemical and electricity generation and therefore, the same cell can be used for both functions. The cell is capable of operating at a high current and high power density in both charging and discharging modes, resulting in lower capital costs. The reactants for chemical and electricity generation are stored separately from the cell which makes it cost effective for both peaking and load leveling (e.g., weekly cycle) and low cost capacity (kWh) increases.

The electrochemical reactions for the hydrogen/tribromide cycle take place in a charge mode and a discharge mode. During charge, hydrogen bromide is electrolyzed into hydrogen and tribromide (with minor amounts of bromine). These fluids are then stored separately outside the electrochemical cell. Since all reactants are stored external from the cell, independent sizing for power and energy storage becomes a distinct advantage. During discharge, the hydrogen and tribromide solution are delivered to the cell, where they react electrochemically to produce electric power and hydrogen bromide.

During charge (electrolysis), concentrated hydrobromic acid is electrolyzed and tribromide is formed at the positive electrode. Hydrated protons are transported across the membrane, and hydrogen gas is formed at the negative electrode. The hydrogen and tribromide that are formed during the charge mode are stored external to the cell, and they are fed back to the cell during the discharge (fuel cell) mode to produce electrical energy.

The quantity of tribromide species and minor amount of soluble free bromine available in the solution establishes the discharge capacity of the positive electrode in a hydrogen/tribromide fuel cell. A large mass of tribromide is ordinarily desirable in order to maximize the overall fuel cell capacity.

This disclosure provides a fuel cell comprising an anode, a cathode and a solid electrolyte membrane disposed between the anode and the cathode. The anode comprises a support and a catalyst dispersed thereon, wherein the catalyst comprises at least one precious metal. The cathode comprises a support and a catalyst dispersed thereon. The catalyst comprises carbon powder or at least one precious metal with or on carbon powder. The catalyst dispersed on the anode and the catalyst dispersed on the cathode are the same or different and are capable of catalyzing, in the presence of a halogen ion or a mixture of halogen ions, a reaction between a fuel and an oxidant to generate an electric current.

Nanoporous-proton conducting membranes (NP-PCM) employed in the fuel cells of this disclosure allow water management which prevents porous electrodes from flooding. This makes such electrodes advantageous for use in the fuel cells of this disclosure.

The fuels useful in the fuel cells of this disclosure are conventional materials and include, for example, hydrogen and alcohols. The oxidants useful in the fuel cells of this disclosure are conventional materials and include, for example, oxygen, bromine, chlorine and chlorine dioxide.

Further objects, features and advantages of the present disclosure will be understood by reference to the following drawings and detailed description.

Various modifications and variations of this disclosure will be obvious to a worker skilled in the art and it is to be understood that such modifications and variations are to be included within the purview of this application and the spirit and scope of the claims.

EXAMPLES

Catalysts Synthesis and Characterization

Various catalysts were synthesized and their activity was tested electrochemically ex-situ and in-situ. Part of the catalysts were synthesized to be a skin-type—having a full or almost a full monolayer of one type of metal deposited on the other type of the metal or their alloy. Synthesized catalysts comprised Pt, Ir, Ru, Pd, Re, Mo, Co, and Cr. Some of the catalysts were supported on Vulcan XC-72 carbon-powder.

The synthesis procedure could be electroless deposition. It can be performed in acid or alkaline media, employing various reducing agents such as sodium borohydride, formic acid, formaldehyde at a temperature range of RT-80° C. Another synthesis procedure type is polyol method, using ethylene glycol, diethylene glycol or others.

Samples of catalysts that were synthesized include the following:

PtRe type catalysts in which the Re atomic concentration was in the range of 0-22% and total metal loading in the range of 11-69%;

PdRe type catalysts in which the Re atomic concentration was in the range of 0-10% and total metal loading in the range: 45-60%;

Pt/Ir catalysts in which the Pt atomic concentration was in the range of 5-95% and total metal loading in the range: 35-100%; and Pt/Ir catalysts that were synthesized in accordance with Example 9 at room temperature or at 2° C.

Samples of the above catalysts were synthesized by the electroless deposition method, employing $NaBH_4$ as a reducing agent, and/or by polyol method, using ethylene glycol. All the catalysts can be divided in 4 groups: Pt based, Pd based, Ru based and Ir based. The procedures presented numbered below are typical for the 4 types of catalysts above.

Example 1

60% (w/w) $Pt_{94}Re_6$/XC-72 Synthesis 0.200 g of XC-72 was added to 100 ml 0.4M HCl. 0.519 g of $PtCl_4$ and 0.840 g of $NaReO_4$ were added to the obtained slurry while stirring. The slurry was kept under stirring for 1 hour. 10 ml of $NH_4OH$ were added to the slurry in small portions. The pH of the solution was 11-12. 0.524 g $NaBH_4$ were dissolved in 10 ml $H_2O$ and added to the slurry rapidly and in one portion. The slurry was kept under stirring for 1 h. The catalytic powder obtained was recovered by centrifugation, treated in 1M $H_2SO_4$ at 80° C. for 8 hours, washed with distilled water until no chloride ions could be detected and dried by evaporation.

In case of PtReCo and PtReMo the precursors that were added to the solution in synthesis 2.2.1 in FIG. 3 for Co and Mo were $CoCl_2.6H_2O$ and $(NH_4)_6Mo_7O_{24}.4H_2O$ respectively.

Example 2

30% (w/w) PtCr/XC-72

1.4 g XC-72 were suspended in 100 ml of $H_2O$ and XC-72 was finely dispersed by sonicating for 15 min. The slurry was then stirred and 1.74 ml of about 69% $HNO_3$ were added. 0.861 grams of PTA $H_2PtOH_6$ were added to 826 ml of 4.0M $HNO_3$ in a separate flask. PTA solution was transferred to a carbon slurry and stirred for 30 min. The beaker was heated at 1° C./min rate up to 70° C. and this temperature was maintained for 1 h under stirring. After the heating was stopped $NH_3$ (about 30%) was added to the slurry at a rate of 10 ml/min, until reaching a pH between 3 and 3.5 and the solution was cooled down to room temperature under stirring. 0.378 grams of $Cr(NO_3)_3.9H_2O$ were dissolved in 50 ml water and added to a slurry and ultrasonicated. After 30 min the pH of the slurry was adjusted to about 4.5 with 0.5M $NH_4OH$. After 30 minutes, the heating of the solution was resumed by raising temperature to 75° C. at 1° C./min rate. The solution was stirred and pH was controlled with further additions of ammonia. After reaching 75° C. the solution was heated under stirring for 1 hour and then cooled down to room temperature and filtered. The obtained powder was washed and dried. Then it was heat-treated in $H_2$ stream at 300° C. for 30 minutes and in Ar at 850° C. for 1 hour.

Example 3

30% Ru/XC-72

Ru on carbon was synthesized by polyol process in ethylene glycol. A mix of 0.5 grams 1% (w/w) Pt/XC-72 and about 1 gram $RuCl_3$ in 900 ml ethylene glycol was stirred for 0.3 hours at 170° C. The powder was filtered; washed in $H_2O$ and acetone and vacuum dried at 100° C. The powder was acid treated in 0.5 M $H_2SO_4$ at 80° C. for 8 hours, and washed in $H_2O$.

Example 4

44% (w/w)($Pt_{30}/Ru_{70}$)/XC-72

The catalyst was synthesized by the method described herein (synthesis 2.1.1 in FIG. 3), while Pt from $PtCl_4$ was deposited on Ru/XC-72 (synthesis 2.2.3 in FIG. 3) by $NaBH_4$ reduction in acidic media.

Example 5

80% ($Pt_{11}/Ir_{36}/Ru_{53}$)/XC-72

The catalyst was synthesized by the method described herein (synthesis 2.2.1 in FIG. 3), while Ir from $IrCl_3$ was deposited on Ru/XC-72 (synthesized by procedure 2.1.3 in FIG. 3) by $NaBH_4$ in acidic media. After Ir deposition solution pH was brought to 1 by addition of 5M HCl, and the deposition procedure (synthesis 2.2.1 in FIG. 3) was repeated for Pt.

Example 6

60% (w/w) Pd$_{98}$Re$_2$/XC-72 Synthesis 0.200 grams of XC-72 were added to 100 ml 0.4M HCl. 0.519 g of PdCl$_2$ and 1.54 g of NaReO$_4$ were added to the obtained slurry while stirring. The slurry was kept under stirring for 1 h. 10 ml of NH$_4$OH were added to the slurry in small portions. The pH of the solution was 11-12. 0.0375 g NaBH$_4$ were dissolved in 10 ml H$_2$O and added to the slurry rapidly and in one portion. The slurry was kept under stiffing for 1 hour. The catalytic powder obtained was recovered by centrifugation, treated in 1M H$_2$SO$_4$ at 80° C. for 8 hours, washed with distilled water until no chloride ions could be detected and dried by evaporation.

In case of the ternary alloy PdReCo the precursor for Co that were added to the solution in synthesis 2.2.6 in FIG. 3 was CoCl$_2$.6H$_2$O.

Example 7

36% (why) Ir/XC-72

0.32 g of XC-72 were added to 100 ml 0.4M HCl. 0.33 grams of IrCl$_3$ were added to the obtained slurry while stirring. The slurry was kept under stirring for 1 h. 6 ml of NH$_4$OH were added to the slurry in small portions. The pH of the solution was 11-12. 0.15 grams NaBH$_4$ were dissolved in 10 ml H$_2$O and added to the slurry rapidly and in one portion. The slurry was kept under stirring for 1 h. The catalytic powder obtained was recovered by centrifugation, washed with distilled water until no chloride ions could be detected and dried by evaporation.

In case of Ir/Ru, Ir was deposited from IrCl$_3$ on Ru powder instead of XC-72.

Example 8

Pt$_{15}$/It$_{85}$ 3.4 grams Ir were added to 1 L 0.4M HCl. 1.03:6 g PtCl$_4$ were added to the obtained slurry while stirring. The slurry was kept under stirring for 1 h. 60 ml of NH$_4$OH were added to the slurry in small portions. The pH of the solution was 11-12. 0.464 g NaBH$_4$ were dissolved in 60 ml H$_2$O and added to the slurry rapidly and in one portion. The slurry was kept under stirring for 1 h. The catalytic powder obtained was recovered by filtration, treated in 0.5M H$_2$SO$_4$ at 80° C. for 8 hours, washed with distilled water until no chloride ions could be detected and dried by evaporation.

This is a preferred procedure for the synthesis of Pt skin on another metal core, in this case the metal being Ir.

In case of (PtRe)/Ir, (PtRu)/Ir, PtReMo/Ir and PtReCo/Ir, the precursors for Re, Ru, Mo and Co were RuCl$_3$, NaReO$_4$, (NH$_4$)$_6$Mo$_7$O$_{24}$.4H$_2$O and CoCl$_2$.6H$_2$O respectively.

One of the Pt$_{15}$/It$_{85}$ batches was synthesized by the same procedure but at 2° C.

Example 9

40% (w/w) (Pt$_{15}$/Ir$_{85}$)/XC-72

0.18 grams Ir/XC-72 obtained from synthesis 2.1.7 in FIG. 3 were added to 100 ml 0.4M HCl. 0:02 g of PtCl$_4$ were added to the obtained slurry while stirring. The slurry was kept under stirring for 1 hour. 6 ml of NH$_4$OH were added to the slurry in small portions. The pH of the solution was 11-12. 0.0.1 grams NaBH$_4$ were dissolved in 10 ml H$_2$O and added to the slurry rapidly and in one portion. The slurry was kept under stirring for 1 hour. The catalytic powder obtained was recovered by centrifugation, treated in 1M H$_2$SO$_4$ at 80° C. for 8 hours, washed with distilled water until no chloride ions could be detected and dried by evaporation.

40% (w/w) (Pt$_{30}$/Ir$_{70}$)/XC-72 catalyst was prepared by the same procedure, while increasing amount oldie deposited PtCl$_4$.

Catalysts synthesized by the method described above were characterized by electrochemical (Cyclic Voltammetry—CV), Fuel Cell (FC) micropolarization and physical techniques (Energy-dispersive X-ray spectroscopy—EDS, X-ray photoelectron spectroscopy—XPS, X-ray diffraction—XRD). CV was employed in order to evaluate the electrochemical active surface area (ECSA) and ex-situ activity of the catalysts in the HER. The reaction resistance (R) was determined from the micropolarization plots of hydrogen redox reaction at ±50 mV around E$_{rev}$ (in the tested solution) under 8% H$_2$-92% Ar atmosphere while the working electrode consisted of the catalyst ink supported on glassy carbon. The slope of the potential vs. current curve near E$_{rev}$ is a measure for the reaction resistance. The FC micropolarization was performed in order to evaluate the in-situ activity of the synthesized catalyst in both HOR and HER reactions. Current steps were applied to the cell and from the current-potential plot slope at low over-potentials the catalysts reaction resistance was calculated. EDS and XPS allow evaluation of the chemical composition of the sample, while EDS reveals the bulk composition and XPS—the surface composition. XPS of the sputtered sample averages the bulk and surface compositions. Grain size of the catalyst was measured by means of XRD, using Scherrer equation.

Catalysts Synthesis Results

The results of the characterization-measurements of the part of the synthesized catalysts are summarized in FIG. 3. The data from both EDS and XPS allows evaluating the structural composition of the catalysts—the concentration of the metals in the bulk and on the surface. Skin-type or core-shell alloy catalysts, where the outer layer of a particle consists of a different metal than the core are known to be the most active catalysts in PEMFCs. XRD allows estimation of grain size of the synthesized catalysts. The desired grain size is in the range of 2-5 nm, while higher grain sizes lead to a smaller surface area, reducing the amount of the reaction sites upon the catalyst and lower grain sized are mostly found at amorphous catalysts structures, the desired structure is a core-shell ordered type. CV measurements allowed to calculate ECSA of the catalysts, while as mentioned before, higher surface of the catalyst assures higher amount of catalytic sites, improving catalyst activity. The reaction resistance is measured by CV and it is reversely proportional to the exchange current density of the reaction (Eq. 1), being a measure for catalyst activity—the higher exchange current density—the lower the resistance of the reaction—the more active is the catalyst.

$$E - E_{eq} = \frac{RT}{i_0 nF} \cdot i = R_{reaction} \cdot i \quad \text{(Eq. 1)}$$

E—measured potential,
E$_{eq}$—equilibrium potential,
R—ideal gas constant,
T—temperature,
i$_0$—exchange current density,
n—number of moles,
F—Faraday number,
i—current density,
R$_{reaction}$—reaction resistance.

XRD

Grain sizes of the PtRe and PtReM (M=transition metal) are in the range of 2.7-5.4 nm, of the PdRe and PdReM are in the range of 26-53 nm and of the Pt/Ir and PtM/Ir are in the range of 2.2-3.2 um of the common phase and 2.1-2.4 nm of Pt and 4.6-4.9 nm of Ir alone. Carbon supported Pt/Ir catalysts grain sizes are in the range of 2.2-2.7 nm.

Other catalysts type grain sizes were in the range of about 3 nm.

Most of the catalysts demonstrated unordered solid-solution structure, while Pt/Ru/XC-72, Pt/Ir/Ru/XC-72, Pt/Ir (one sample) and (PtRe)/Ir showed distinct phases of Pt and Ru; Pt, Ir and Ru; Ir and Pt and Ir and Pt respectively. PtReMo/Ir and PtReCo/Ir obtained ah alloy phase in addition to the Ir phase.

XPS

According to the XPS analysis Pt concentration on the catalyst surface is higher than in the bulk, for example in catalysts PtRe/XC-72, PtRe/Ir, PtRe/Ir, meaning that a skin-like catalyst is formed, while the outer catalyst shell comprises mostly of Pt. This is also supported by the cyclic voltammograms of Pt/Ir showing that the $O_{ads}$ desorption peak is positioned between Pt—O and Ir—O oxidation potentials, indicating Pt abundance on the surface. Some catalysts had sub monolayer of Pt on the core metal/alloy. In some cases this sub Monolayer structure provides better activity (per mg Pt) than the similar Pt alloy or the full Pt monolayer catalyst. Skin-type catalysts were found to be highly active and stable in the HER and HOR in HTBFCs.

CV

Reaction resistances of the PtRe and PtReM (M=transition metal) are in the range of 0.046-0.067 Ω·mg (TM) (where TM stands for total metal content), of the PdRe and PdReM are in the range of 15 Ω·mg(TM) and of the Pt/Ir and PtM/Ir are in the range of 0.06-0.09 Ω·mg(TM). Carbon supported Pt/Ir catalysts have the lowest $R_{reaction}$, in the range of 0.016-0.035 Ω·mg(TM).

The durability of many catalysts including sub monolayer ones found to be very good. Many thousands of charge—discharge (HOR/HER) cycles were achieved.

Hydrogen Electrode

Synthesized catalysts were employed in the gas and in some embodiments in the solution electrodes.

The hydrogen electrode is usually composed of multilayer structure. The first layer is a carbon support; second layer is a diffusion layer (GDL), and the third layer is the catalytic layer.

The carbon support is a commercial cloth about 100 to 300 μm thick or a paper of similar thickness, with degree of hydrophobicity varying from 0 to 50%.

The GDL suspension is composed of carbon powder (such as XC72, Black Pearl 2000, SB or others) and 5-50 wt % polymeric binder (usually PVDF or PTFE) mixed for 1-4 hours with an appropriate solvent, which is known to dissolve the binder used. The mixing is performed either by magnetic stirrer or by mechanical stirrer (homogenizer). The resulting slurry is spread by doctor blade (or any other coating technique) method using a fixed-opening K-Bar onto the carbon support and then cured in an oven for 1-3 hours at 140-350° C. (depending on the type of the polymer).

The catalytic layer was created by coating the GDL, with a layer of catalytic ink using a doctor blade method. Alternatively or additionally, the membrane is coated with a catalytic layer. Still alternatively or additionally, the carbon support is coated with a catalytic layer.

Optionally, the catalytic layer is applied in the form of a catalytic ink. Catalytic ink was prepared by mixing the catalyst powder with carbon, ionomer and other additives according to well known procedures. See, for example, Xiaoping Yana Hanfan Liu*a and Kong Yong Liewb; J. Mater. Chem., 2001, 11, 3387-3391, Size control of polymer-stabilized ruthenium nanoparticles by polyol reduction. After applying the catalytic layer, by doctor blade method (or any other coating technique), the electrode was cured at 1-30 to 145° C. for 1-2 hours, followed by acid treatment, as described in Example 11. In some cases the resulting electrode was coated with an additional layer of 0.1 to 2 mg/cm$^2$ Nafion.

Example 10

(Hydrogen Side GDL Ink)

In a 250 mL beaker mix 2 gr of PVDF with 120 ml cyclopentanone (CP) over a magnetic stirrer. Heats to 40° C. until clear solution is obtained then close the heating and leave solution to cool to room temperature. Add 6 g of XC-72R and 20-30 ml CP and stir for 0.5-1 hour. Remove stirrer and put the ink under homogenizer treatment for about 1 hour. Apply two layers of the GDL ink on the carbon support (cloth) using 300 μm K-Bar, after each layer curing is necessary at 130° C. for 1 hour.

Example 11

(Hydrogen Side Catalytic Ink)

In a 50 mL vial mix 2.5 grams of catalyst and 0.625 grams carbon powder with 4 mL of water, of iso-propyl alcohol and 2 mL of Nafion 5% solution for 1 hour. Add 0.8 mL of glycerol and stir for 15 minutes, following, by an addition of 0.350 mL of tetrabutylammonium hydroxide (TBA-OH). After additional hour of stirring, another 0.8 mL glycerol was added and the solution was left to mix overnight (at least 16 hours). The resulting ink was applied onto the GDL (like example 1) using 100 μm gap K-Bar in doctor blade method. The electrode was left to dry at RT for 1-2 hours followed by curing at 145° C. for 1 hour. After the curing process the electrode was boiled in 0.5M sulfuric acid for 1 hour and then boiled in DI water for another hour, after which the electrode was dried in an oven for 1 hour at 105° C. The resulting electrode was cut to the final dimensions and weighted to reach the loading of about 2 mgTM/cm$^2$.

Example 12

An electrode ink was made by mixing 75 wt. % Pt catalyst "Johnson-Matthey" nanopowder, 15 wt. % Nafion and 10 wt. % carbon powder. The ink was applied directly on the membrane. The catalyst loading was between 4 and 7 mg/cm$^2$. Sec "Water-Neutral Micro Direct-Methanol Fuel Cell (DMFC) for Portable Applications"; A. Blum, T. Duvdevani, M. Philosoph, N. Rudoy, E. Peled; Journal of Power Sources 117 (2003) 22-25:

Solution Electrode

The electrode at the solution compartment (where $Br^-$/$Br_3^-$ reaction takes place) is composed of carbon-based suspension with a polymeric binder and a small (or none) amount of the catalyst powder as described previously.

The carbon support of the electrode is a commercial cloth or paper about 100-300 μm thickness.

The suspension is optionally composed of carbon powder (such as XC72, Black Pearl 2000, SB, carbon nano tubes or others) and from about 5% up to about 50% % wt polymeric binder (for example, PVDF or PTFE) and a pore-former up to 80% in volume.

Examples of suitable pore-formers include PC (propylene carbonate), EG (ethylene glycol), and mixtures thereof.

The ink components are mixed for 0.5-4 hours with an appropriate solvent by magnetic stirrer, ball-mill, homogenizer or other mixing method. The resulting ink is applied on the carbon support using doctor blade technique or any other coating technique.

Nafion emulsion can be applied to the electrode in the same composition as described for the hydrogen electrode.

Alternatively the catalytic ink can be applied directly to the membrane.

Example 13

(Bromine Side Ink 80% Designed Porosity)

First mix 0.336 grams PVDF in 20 ml of cyclopentanone, 2 hours at least, until PVDF is dissolved. Afterwards 3.75 g XC-72R, 0.102 grams catalyst powder are added along with 7.78 mL propylene carbonate and 40 mL cyclopentanone. The resulting suspension is shaked in a ball-mill for 1.5 h. The ink is coated on the carbon support with a 200 µm K-Bar using doctor blade apparatus.

Example 14

(Bromine Side Ink 50% Designed Porosity)

Mix 4.68 grams mesophase carbon microbeads (MCMB), 0.42 grams PVDF and 0.126 grams catalyst with 15 mL cyclopentanone in a 50 mL vial. Add 2.34 mL of propylene carbonate and stir over a magnetic stirrer for 1-2 hours. Move the stirred ink to a homogenizer and mix for additional 0.5-1 hour until no agglomerates are visible. Coat the carbon support using 12 µm K-Bar by doctor blade apparatus.

Both the solution and hydrogen electrodes described above were used in the HTBFC. They comprised the catalysts: PtRe/XC-72, PtReCo/XC-72, PtReMo/XC-72, Pt/Ir/Ru/XC-72, PdRe, PdRe, (PtRe)/Ir, (PtRu)/Ir, PtReMo/Ir, and PtReCo/Ir which were used for HOR/HER.

Catalysts activity and electrodes efficiency of the solution and hydrogen electrodes were measured in-situ in the HTB-FCs while the electrodes are a part of MEA (discussed herein) by means of micropolarization, determining reaction resistances of the catalysts used in the electrodes. In addition, the solution electrode was tested ex-situ by means of CV in order to evaluate the surface area of the catalyst utilized in the electrode.

Solution Electrode CV Characterization Results

Solution electrodes comprising Pt/Ir catalyst were tested by means of CV in order to estimate the utilization of the catalyst in the electrode. The obtained ECSA was close to the one measured on the same catalyst deposited on glassy carbon (section 5.2, table 1), meaning that there is almost a full utilization of the catalyst surface in the electrode which should lead to the high activity of the electrode in the HTBFC.

MEA Preparation

The MEA was prepared by hot pressing of membranes at 60-130° C. and at 10-60 kg/cm$^2$ between two electrodes coated by GDL and catalyst layers, as shown in FIG. 1.

In various embodiments, the membrane was an NP-PCM having a thickness of 50-to 400 µm. In exemplary embodiment, the NP-PCM composition (in vol/vol %) was 60% void, 32-28% PVDF, and 8-12% SiO$_2$.

Alternatively, the positive or negative electrode catalyst is coated directly on the membrane or using "decaling" process. In Such process the catalyst ink is coated over an inert substrate which is hot pressed to the membrane and the catalytic layer is fully transferred to the membrane. A carbon support (cloth or paper) is then placed over the catalytic layer to improve the mechanic and electronic properties of the electrode.

Application and Integration

Figure 2:
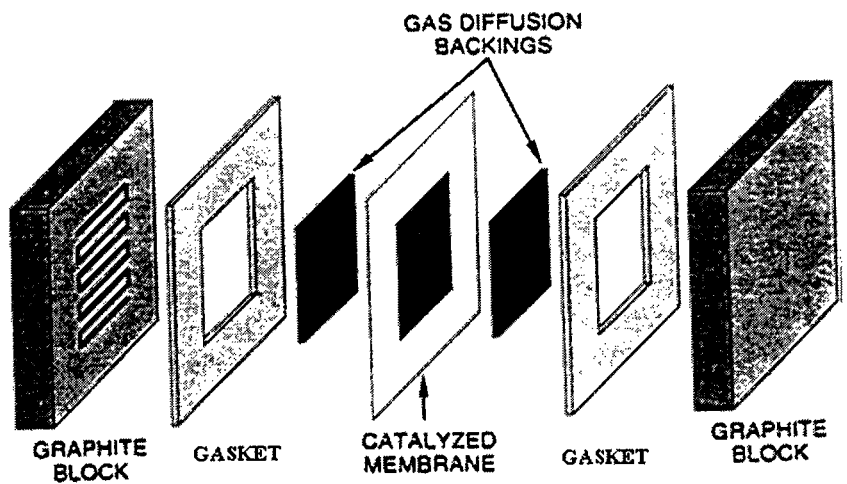
FIG. 2 is a schematic representation of single cell components.

As a test vehicle we used a 7 cm$^2$ FC. The fuel-cell housing was built from synthetic graphite blocks in which flow fields were engraved, one for the HBr solution and the other for hydrogen. The MEA was placed between two gaskets and the graphite blocks, as described in FIG. 2. All together were held between two backing plates equipped with a set of bolts positioned around the periphery of the cell. The cell was fed with pure hydrogen from a compressed cylinder on one side, and a solution of diluted hydrobromic acid on the other side. The solution was circulated using a diaphragm pump and was heated to about 40° C.

Cell Results

The various types of catalysts reported in the previous section were evaluated in the RFC using HBr cathode, as presented in FIG. 4. Both negative and positive electrodes were prepared as described herein. Cells were constructed as described herein in the area range of 7 cm$^2$. The performance of the catalyst in the cell was assessed using reaction resistors, of charge and discharge micropolarization.

In addition, the optimization of performance included variation and modifications of catalyst loading and practical charge/discharge current density, to improve the efficiency of the cells. The various cells were operated at 0.05-1 W/cm$^2$, typically 0.2 W/cm$^2$ to obtain high efficiency.

As mentioned before, better catalysts are associated with lower resistance, both in the charging and in the discharging process. For some applications, resistances of less than 0.5 Ω/cm2 are preferable. Among the cells described in the following table, the most preferable catalysts for such applications are those used in cells 501K, 458A, 192K, and 191Y, which are: Ir, Pt/Ir, PtRe/Ir and PtReMo/Ir.

Results Summary

According to the characterization results from different electrochemical and physical methods, the catalysts synthesis procedures can produce skin-type catalysts which are favorable for HOR/HER reactions. In addition, such synthesis procedure allows using less expensive metals as a base for platinum, while the outer layer of such catalyst comprises mostly Pt, being the most active catalyst towards HOR/HER.

According to CV measurements, preferred synthesized catalysts for HER are PtReM/XC-72, Pt/Ir, Pt/Ir/XC-72, PtReM/Ir. According to the cells results, the preferred active catalysts towards HOR/HER are Ir, Pt/Ir, PtRe/Ir and PtReMo/Ir. Combining the CV and micropolarization data from cells, preferred catalysts are Pt/Ir and PtReMo/Ir, while Pt/Ir has a more perfect skin structure (as measured by XPS), potentially lowering the catalyst's price. In addition, Pt/Jr was found to be stable in thousands of charge/discharge cycles in the cell. Pt/Ir is a preferred HTBFC catalyst.

While we have shown and described several embodiments in accordance with our disclosure, it is to be clearly understood that the same may be susceptible to numerous changes apparent to one skilled in the art. Therefore, we do not with to be limited to the details shown and described but intend to show all changes and modifications that come within the scope of the appended claims.

What is claimed is:

1. An anode comprising a support and a catalyst dispersed thereon, wherein said catalyst comprises at least one precious metal selected from Pt, Ru, Re, Pd and Ir, wherein said catalyst composition catalyzes, in the presence of a halogen ion or a mixture of halogen ions, (a) a hydrogen oxidation charging reaction (HOR) and a hydrogen evolution discharging reaction (HER) in a regenerative fuel cell and/or (b) a reaction between a fuel and an oxidant to generate an electric current; wherein said catalyst composition is selected from the group consisting of (i) Ir, Ru, Pd, Pt, Re, and mixtures thereof, and alloys thereof; (ii) alloys of Ir, Ru, Pd, Pt and Re with one or more transition metals selected from Cr, Mo, Ta, Ni, Co and Fe; (iii) (PtRe) in combination with M, (PdRe) in combination with M, and (PtM) in combination with Ir, wherein M is a precious metal selected from Pt, Ru, Re, Pd and Ir, or a transition metal; and (iv) PtRe, PdRe, PtIr, PdIr, PtCr, PtRu, Pt in combination with Ir in combination with Ru, PtReCo, PtReMo, Ir in combination with Ru, (PtRe) in combination with Ir, (PtRu) in combination with Ir, (PtReMo) in combination with Ir, and (PtReCo) in combination with Ir; wherein the catalyst composition is dispersed on the anode that is part of a membrane electrode assembly (MEA) in a regenerative fuel cell; wherein the regenerative fuel cell has a nanoporous proton conducting membrane capable of exhibiting operational stability in the regenerative fuel cell, having pores with a diameter size which is essentially smaller than 50 nm, and comprises: (i) 5% to 60% by volume of an electrically nonconductive inorganic powder having acid absorption capacity, wherein the powder comprising essentially nanosize particles; (ii) 5% to 50% by volume of a polymeric binder that is chemically compatible with acid, oxygen and fuel; and (iii) 10 to 90% by volume of an acid or aqueous acid solution.

2. The anode of claim 1 wherein the support comprises a plurality of porous regions that define pore surfaces, wherein the pore surfaces have said catalyst dispersed thereon such that the catalyst is non-contiguously dispersed throughout the plurality of porous regions, wherein the plurality of porous regions are nanoporous, mesoporous and/or macroporous.

3. The anode of claim 2 wherein nanoporous comprises an average pore size less than 2 nm, mesoporous comprises an average pore size of 2 nm to 50 nm, and macroporous comprises an average pore size greater than 50 nm.

4. The anode of claim 1 which is hydrophobic.

5. A cathode comprising a support and a catalyst dispersed thereon, wherein said catalyst comprises at least one precious metal selected from Pt, Ru, Re, Pd and Ir, wherein said catalyst composition catalyzes, in the presence of a halogen ion or a mixture of halogen ions, (a) a hydrogen oxidation charging reaction (HOR) and a hydrogen evolution discharging reaction (HER) in a regenerative fuel cell and/or (b) a reaction between a fuel and an oxidant to generate an electric current; wherein said catalyst composition is selected from the group consisting of (i) Ir, Ru, Pd, Pt, Re, and mixtures thereof, and alloys thereof; (ii) alloys of Ir, Ru, Pd, Pt and Re with one or more transition metals selected from Cr, Mo, Ta, Ni, Co and Fe; (iii) (PtRe) in combination with M, (PdRe) in combination with M, and (PtM) in combination with Ir, wherein M is a precious metal selected from Pt, Ru, Re, Pd and Ir, or a transition metal; and (iv) PtRe, PdRe, PtIr, PdIr, PtCr, PtRu, Pt in combination with Ir in combination with Ru, PtReCo, PtReMo, Ir in combination with Ru, (PtRe) in combination with Ir, (PtRu) in combination with Ir, (PtReMo) in combination with Ir, and (PtReCo) in combination with Ir; wherein the catalyst composition is dispersed on the cathode that is part of a membrane electrode assembly (MEA) in a regenerative fuel cell, or carbon powder; wherein the regenerative fuel cell has a nanoporous proton conducting membrane capable of exhibiting operational stability in the regenerative fuel cell, having pores with a diameter size which is essentially smaller than 50 nm, and comprises: (i) 5% to 60% by volume of an electrically nonconductive inorganic powder having acid absorption capacity, wherein the powder comprising essentially nanosize particles; (ii) 5% to 50% by volume of a polymeric binder that is chemically compatible with acid, oxygen and fuel; and (iii) 10 to 90% by volume of an acid or aqueous acid solution.

6. The cathode of claim 5 wherein the support comprises a plurality of porous regions that define pore surfaces, wherein the pore surfaces have said catalyst dispersed thereon such that the catalyst is non-contiguously dispersed throughout the plurality of porous regions, wherein the plurality of porous regions are nanoporous, mesoporous and/or macroporous.

7. The cathode of claim 6 wherein nanoporous comprises an average pore size less than 2 nm, mesoporous comprises an average pore size of 2 nm to 50 nm, and macroporous comprises an average pore size greater than 50 nm.

8. The cathode of claim 5 which is hydrophobic.

9. A membrane electrode assembly (MEA) in a regenerative fuel cell, said membrane electrode assembly (MEA) comprising an anode, a cathode and a nanoporous proton conducting membrane disposed between said anode and said cathode; said anode comprising a support and a catalyst dispersed thereon, said catalyst comprising at least one precious metal selected from Pt, Ru, Re, Pd and Ir; said cathode comprising a support and a catalyst dispersed thereon, said catalyst comprising carbon powder or at least one precious metal selected from Pt, Ru, Re, Pd and Ir with carbon powder; wherein the catalyst dispersed on said anode and the catalyst dispersed on said cathode are the same or different and catalyze, in the presence of a halogen ion or a mixture of halogen ions, (a) a hydrogen oxidation charging reaction (HOR) and a hydrogen evolution discharging reaction (HER) in the regenerative fuel cell and/or (b) a reaction between a fuel and an oxidant to generate an electric current; and wherein the nanoporous proton conducting membrane is capable of exhibiting operational stability in the regenerative fuel cell, has pores with a diameter size which is essentially smaller than 50 nm, and comprises: (i) 5% to 60% by volume of an electrically nonconductive inorganic powder having acid absorption capacity, wherein the powder comprising essentially nanosize particles; (ii) 5% to 50% by volume of a polymeric binder that is chemically compatible with acid, oxygen and fuel; and (iii) 10 to 90% by volume of an acid or aqueous acid solution.

10. The membrane electrode assembly (MEA) of claim 9 wherein the catalyst composition comprises at least one precious metal selected from Pt, Ru, Re, Pd and Ir, wherein said catalyst composition catalyzes, in the presence of a halogen ion or a mixture of halogen ions, (a) a hydrogen oxidation charging reaction (HOR) and a hydrogen evolution discharging reaction (HER) in the regenerative fuel cell and/or (b) a reaction between a fuel and an oxidant to generate an electric current; wherein said catalyst composition is selected from the group consisting of (i) Ir, Ru, Pd, Pt, Re, and mixtures thereof, and alloys thereof; (ii) alloys of Ir, Ru, Pd, Pt and Re with one or more transition metals selected from Cr, Mo, Ta, Ni, Co and Fe; (iii) (PtRe) in combination with M, (PdRe) in combination with M, and (PtM) in combination with Ir, wherein M is a precious metal selected from Pt, Ru, Re, Pd and Ir, or a transition metal; and (iv) PtRe, PdRe, PtIr, PdIr, PtCr, PtRu, Pt in combination with Ir in combination with Ru, PtReCo, PtReMo, Ir in combination with Ru, (PtRe) in combination with Ir, (PtRu) in combination with Ir, (PtReMo) in combination with Ir, and (PtReCo) in combination with Ir; wherein the catalyst composition is dispersed on an anode or a cathode that is part of the membrane electrode assembly (MEA).

11. The membrane electrode assembly (MEA) of claim 9 wherein the catalyst composition comprises at least one precious metal selected from Pt, Ru, Re, Pd and Ir, wherein said catalyst composition catalyzes, in the presence of a halogen ion or a mixture of halogen ions, (a) a hydrogen oxidation charging reaction (HOR) and a hydrogen evolution discharging reaction (HER) in the regenerative fuel cell and/or (b) a reaction between a fuel and an oxidant to generate an electric current; wherein said catalyst composition is selected from the group consisting of (i) Ir, Ru, Pd, Pt, Re, and mixtures thereof, and alloys thereof; (ii) alloys of Ir, Ru, Pd, Pt and Re with one or more transition metals selected from Cr, Mo, Ta, Ni, Co and Fe; (iii) (PtRe) in combination with M, (PdRe) in combination with M, and (PtM) in combination with Ir, wherein M is a precious metal selected from Pt, Ru, Re, Pd and Ir, or a transition metal; and (iv) PtRe, PdRe, PtIr, PdIr, PtCr, PtRu, Pt in combination with Ir in combination with Ru, PtReCo, PtReMo, Ir in combination with Ru, (PtRe) in combination with Ir, (PtRu) in combination with Ir, (PtReMo) in combination with Ir, and (PtReCo) in combination with Ir; wherein the catalyst composition is dispersed on an anode or a cathode that is part of the membrane electrode assembly (MEA).

12. The membrane electrode assembly (MEA) of claim 11 wherein the catalyst composition catalyzes hydrogen redox reactions, halogen/halide redox reactions, and hydrogen/trihalide redox reactions.

13. The membrane electrode assembly (MEA) of claim 11 wherein the catalyst composition has a core-shell structure or a skin structure.

14. The membrane electrode assembly (MEA) of claim 11 wherein, for the catalyst composition, (a) the core or particle comprises (1) Pt or a Pt alloy, wherein the Pt alloy includes one or more other precious metals selected from Ru, Re, Pd and Ir; or Pt or a Pt alloy, wherein the Pt alloy includes one or more other precious metals selected from Ru, Re, Pd and Ir, and one or more transition metals selected from Mo, Co, Cr, Ni, Ta and Fe; or (2) a Pt-free metal or a Pt-free alloy, wherein the Pt-free metal includes one or more precious metals selected from Ru, Re, Pd and Ir, and the Pt-free alloy includes two or more precious metals selected from Ru, Re, Pd and Ir; or a Pt-free metal or a Pt-free alloy, wherein the Pt-free metal includes one or more precious metals selected from Ru, Re, Pd and Ir, and the Pt-free alloy includes two or more precious metals selected from Ru, Re, Pd and Ir, and one or more transition metals selected from Mo, Co, Cr, Ni, Ta and Fe; and (b) the shell or skin comprises (1) at least one of a sub-monolayer, atom islands, and one or more layers of a precious metal selected from Pt or Ir, and alloys thereof, wherein the Pt and Ir alloys include one or more other precious metals selected from Ru, Re, and Pd; or (2) at least one of a sub-monolayer, atom islands, and one or more layers of a precious metal selected from Pt or Ir, and alloys thereof, wherein the Pt and Ir alloys include one or more other precious metals selected from Ru, Re, and Pd, and one or more transition metals selected from Mo, Co, Cr, Ni, Ta and Fe.

15. The membrane electrode assembly (MEA) of claim 11 wherein, for the catalyst composition, the at least one precious metal is supported on carbon powder or ceramic powder.

16. The membrane electrode assembly (MEA) of claim 9 wherein the regenerative fuel cell comprises a hydrogen/bromine regenerative fuel cell.

17. The membrane electrode assembly (MEA) of claim 9 wherein the nanoporous proton conducting membrane has pores with a diameter size which is essentially smaller than 30 nm.

\* \* \* \* \*